United States Patent
Heinrich et al.

(10) Patent No.: US 6,850,992 B2
(45) Date of Patent: Feb. 1, 2005

(54) ADDRESS ASSIGNMENT METHOD FOR AT LEAST ONE BUS DEVICE THAT HAS RECENTLY BEEN CONNECTED TO A BUS SYSTEM

(75) Inventors: Andreas Heinrich, Sachsenburg (DE); Bernhard Weiβbach, Frankenberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/344,950
(22) PCT Filed: Aug. 6, 2001
(86) PCT No.: PCT/DE01/03004
§ 371 (c)(1), (2), (4) Date: Feb. 19, 2003
(87) PCT Pub. No.: WO02/15452
PCT Pub. Date: Feb. 21, 2002

(65) Prior Publication Data
US 2003/0167360 A1 Sep. 4, 2003

(30) Foreign Application Priority Data
Aug. 18, 2000 (DE) .......................................... 100 40 438

(51) Int. Cl.[7] .............................................. G06F 13/14
(52) U.S. Cl. ..................... 710/3; 710/8; 710/9; 710/10; 709/221; 709/222
(58) Field of Search .............................. 710/3, 8, 9, 10; 370/254, 471; 709/220, 221, 222

(56) References Cited

U.S. PATENT DOCUMENTS

| | | | |
|---|---|---|---|
| 4,730,251 A | | 3/1988 | Aakre et al. |
| 4,847,834 A | | 7/1989 | Bryant |
| 4,964,038 A | * | 10/1990 | Louis et al. ..................... 710/9 |
| 5,175,822 A | * | 12/1992 | Dixon et al. ..................... 710/9 |
| 5,551,053 A | * | 8/1996 | Nadolski et al. ................ 710/9 |
| 5,671,387 A | * | 9/1997 | Jacobs et al. ................ 711/210 |
| 5,708,831 A | * | 1/1998 | Schon ......................... 709/245 |
| 5,712,852 A | | 1/1998 | Wilson |
| 5,980,078 A | | 11/1999 | Krivoshein et al. |
| 6,098,113 A | * | 8/2000 | Heil et al. ...................... 710/1 |

FOREIGN PATENT DOCUMENTS

DE 197 33 906 2/1999

* cited by examiner

Primary Examiner—Rehana Perveen
(74) Attorney, Agent, or Firm—Staas & Halsey LLP

(57) ABSTRACT

A bus device that has recently been connected to a bus system is first addressable at a pre-set address. A bus master transmits a new address and an identification to the bus device. The bus device compares the transmitted identification with an identification that has been stored in the bus device and assumes the transmitted new address, if the transmitted identification corresponds with the identification that has been stored in the bus device. The bus device is then addressable at the new address.

21 Claims, 3 Drawing Sheets

ADDRESS ASSIGNMENT METHOD FOR AT LEAST ONE BUS DEVICE THAT HAS RECENTLY BEEN CONNECTED TO A BUS SYSTEM

CROSS REFERENCE TO RELATED APPLICATIONS

This application is based on and hereby claims priority to German Application No. 100 40 438.3 filed on Aug. 18, 2000, the contents of which are hereby incorporated by reference.

BACKGROUND OF THE INVENTION

The present invention relates to an address assignment method for at least one bus device that has been newly connected to a bus system, which is first addressable at a pre-set address, whereby a bus master transmits a new address to the bus device, the bus device assumes the transmitted new address, and the bus device is then addressable at the new address.

Address assignment methods for precisely one newly connected bus device are known, for example, in the PROFIBUS under the name "node baptism". Here, the address is assigned by the Service Access Point (SAP) 55 via an acknowledged SRD service.

In the state-of-the-art method, each bus device newly connected to the bus system which is addressable at the pre-set address (by definition address 126) is addressed. Only one bus device that is addressable at this address may therefore be available at one time, since, in the state-of-the-art method, each addressed bus device newly connected to the bus system assumes the transmitted address, regardless of whether the transmitted address is or is not still being assumed by a further bus device.

SUMMARY OF THE INVENTION

An object of the present invention is to produce an address assignment method in which correct address assignment, appropriate to the project concerned, is always possible, even if a plurality of bus devices have been newly simultaneously connected to the bus system.

This object is achieved when an identification is transmitted to the bus device in addition to the new address, the bus device compares the transmitted identification with an identification stored in the bus device and assumes the transmitted new address only if the transmitted identification corresponds to the identification stored in the bus device.

Only the bus device whose identification has been transmitted then assumes the transmitted new address, regardless of the number of bus devices newly connected to the bus system.

The transmission of the identification and the new address is not acknowledged by the bus device newly connected to the bus system, since no interference can then occur on the bus system, even in the case of a plurality of bus devices simultaneously or virtually simultaneously connected to the bus system.

If the bus master, immediately before transferring the identification and the new address, checks whether a different bus device is already addressable at the new address, accidental multiple address assignment cannot occur.

If the new address which is to be assigned has already been assigned, the "node baptism" can then either be omitted or carried out with a different address. An error message can also be output.

If the bus master, immediately after transferring the identification and the new address, checks whether the bus device newly connected to the bus system is addressable at the new address, and, if the bus device newly connected to the bus system is not addressable, retransmits the identification and the new address, the address assignment is repeated until the bus device newly connected to the bus system has assumed its new address. It is thus ensured that the address assignment is actually carried out. The methods for checking the address assignment are known per se.

If the bus master detects that a bus device is no longer addressable, it resumes the address assignment method.

If the new address is retentively stored by the bus device, the newly assigned address is retained even in the event of a power failure. It does not have to be re-assigned. The new address can be stored, for example, in a buffered RAM or in an EEPROM.

A typical application of the address assignment method according to the invention can be found in a field bus, e.g. the PROFIBUS.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
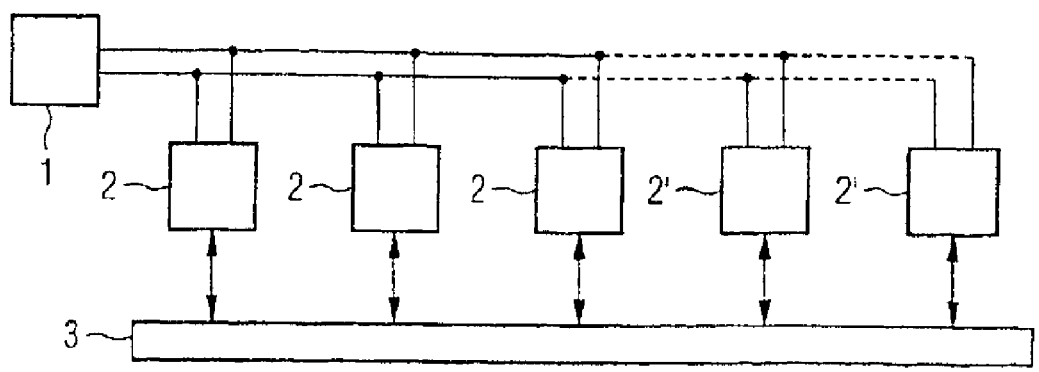
FIG. 1 is a block diagram of a bus system.

Reference will now be made in detail to the preferred embodiments of the present invention, examples of which are illustrated in the accompanying drawings, wherein like reference numerals refer to like elements throughout.

According to FIG. 1, a bus system has a bus master 1 and a plurality, according to FIG. 1 e.g. three, of passive bus devices 2 connected to the bus system. The bus system is designed as a serial bus system of the type generally used in field buses, e.g. the PROFIBUS. A technical installation 3 is controlled and monitored by the bus system. For communication between the bus master 1 and the bus devices 2, the bus master issues addresses and, if necessary, a command and/or data to the bus devices 2. Using the assigned address, these bus devices check whether they are addressed. They respond only if they are addressed.

Figure 2:
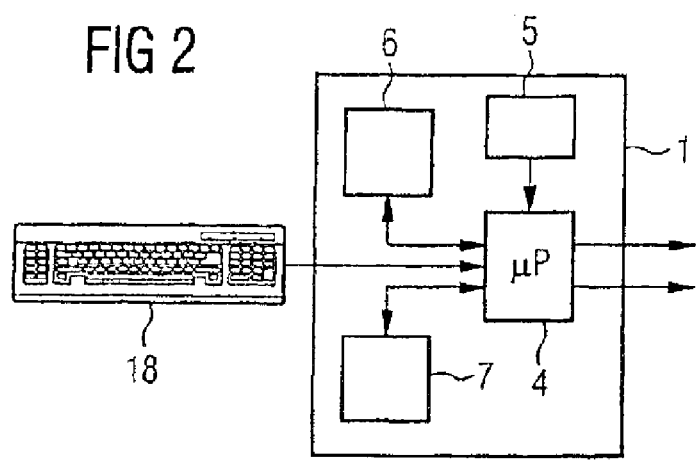
FIG. 2 is a block diagram of a bus master.

According to FIG. 2, the bus master 1 has a microprocessor 4. The microprocessor 4 processes a computer program product which is stored e.g. in an EEPROM 5. Data administered by the microprocessor 4 are stored in a data memory 6 and the addresses of the individual bus devices 2 are stored in a further EEPROM 7.

Figure 3:
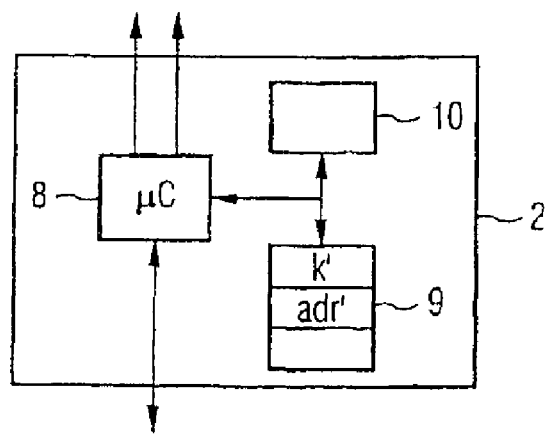
FIG. 3 is a block diagram of a bus device.

According to FIG. 3, the bus devices 2 have a microprocessor 8. The latter similarly runs a computer program product which is stored in an EEPROM 9. In a data memory 10, the bus device 2 buffers data between the bus master 1 and the technical installation 3. An identification k' and an address adr' are further stored in the EEPROM 9.

The identification k' must be unique, at least within the bus system. It is preferably already stored by the manufacturer of the bus device 2 in the EEPROM 9. Here, it can be ensured by suitable measures that this identification k' is only assigned once worldwide.

The address adr' is first set to a previously known value, in the PROFIBUS e.g. to the value 126. The bus device 2 can be addressed at this address adr' until the address adr' is changed by the bus master 1 to a different value, e.g. between 1 and 125.

The above statements on the bus devices 2 also apply to further bus devices 2' which are to be newly connected to the bus system. The only difference between the bus devices 2 and the bus devices 2' is that the former are already operated on the bus at addresses adr' between 1 and 125, whereas the newly connected bus devices 2' still have their initial address 126.

Figure 4:
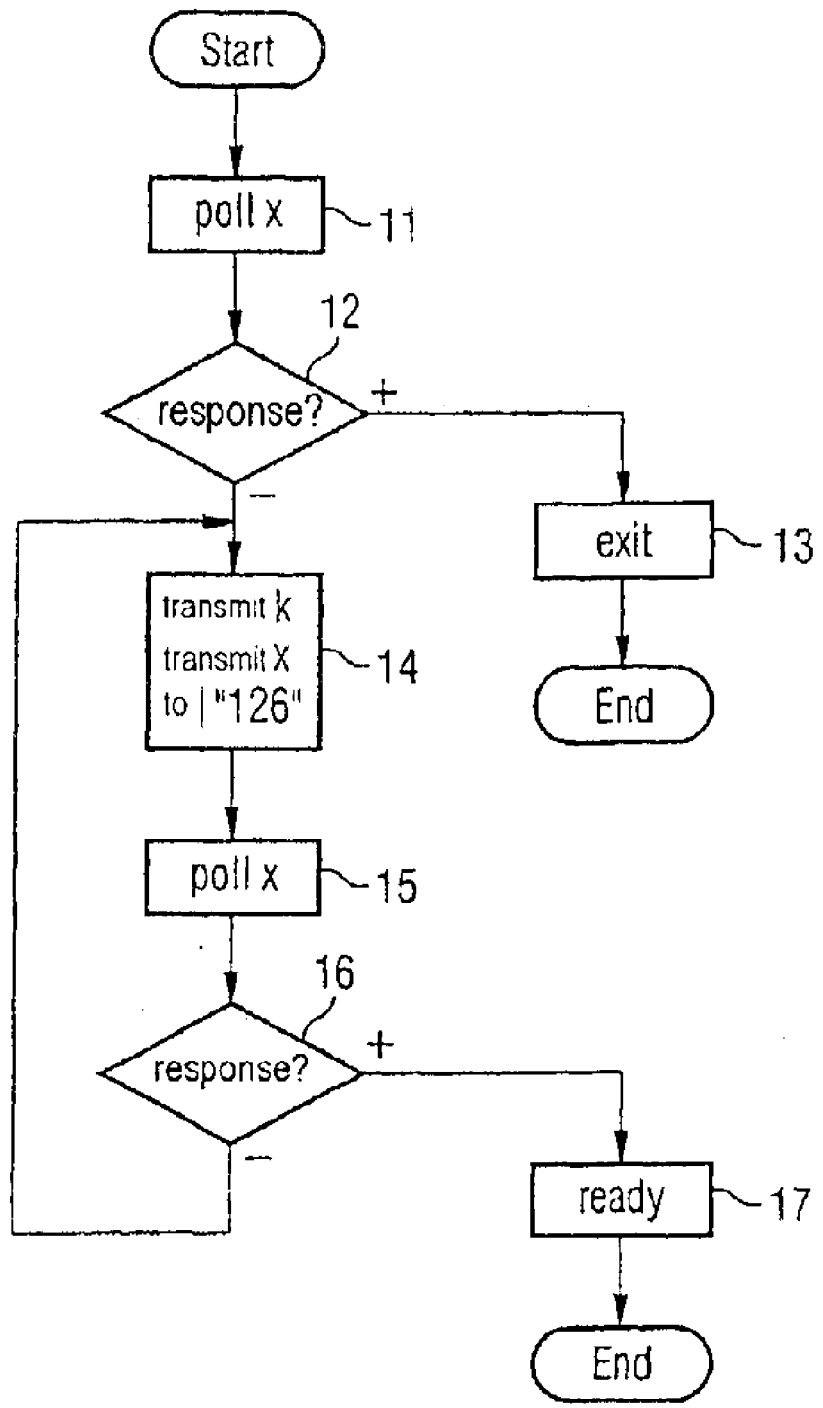
FIG. 4 is a flow chart for the bus master.
Figure 5:
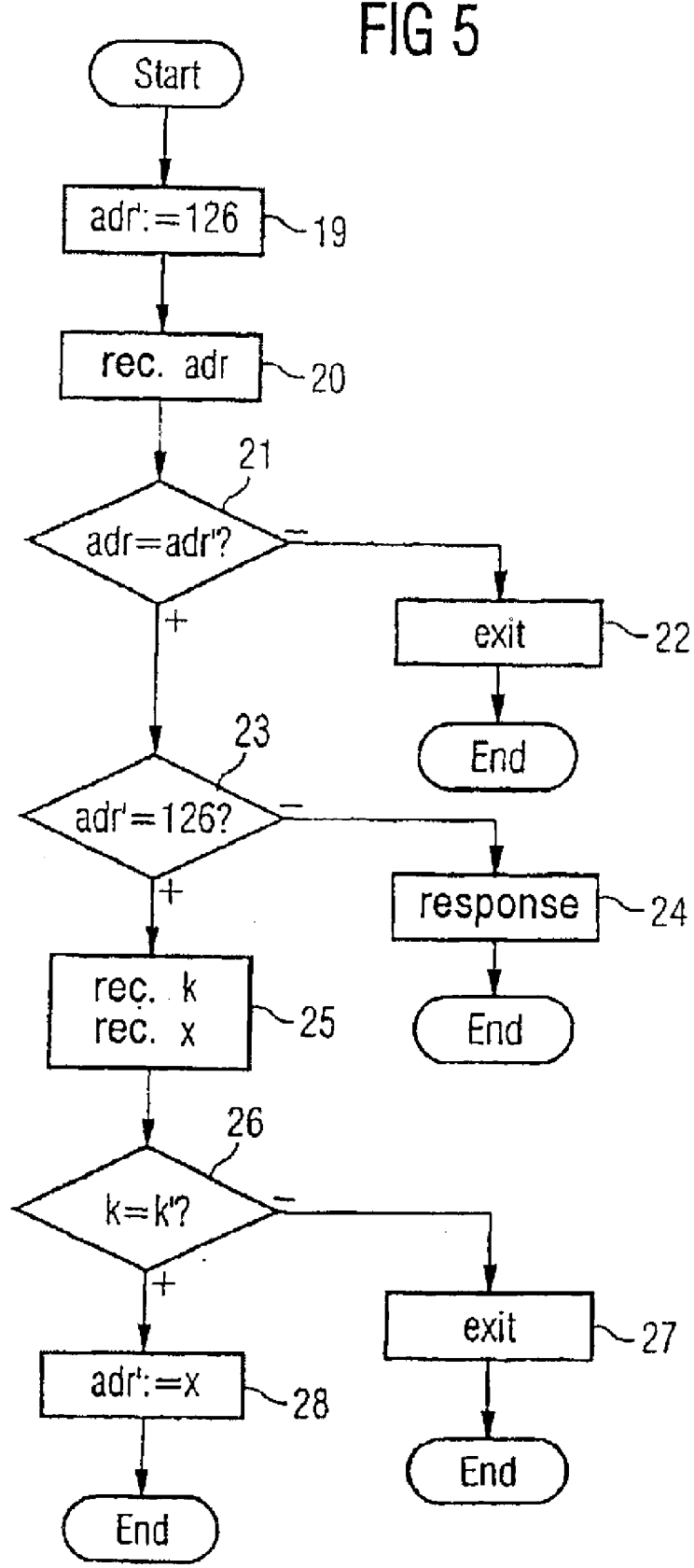
FIG. 5 is a flow chart for the bus device.

In order to enable correct operation of the bus devices 2' newly connected to the bus system, the initial address 126 must first be changed. The procedure for doing this is as follows:

According to FIG. 4, the bus master 1 first requests 11, an address x which is to be newly assigned within the bus system. If the bus master 1 detects 12 a response with this address x, it quits 13 the address assignment program. The bus master 1 therefore first checks whether a bus device 2 is already addressable at the address x which is to be newly assigned.

If the bus master 1 detects no response, it transmits an identification k and the address x which is to be newly assigned at the address 126. Immediately thereafter, it again checks whether a bus device 2, 2' responds at the address x. If the bus master 1 detects 16 a response, the bus device 2' newly connected to the bus system has assumed the address x, i.e. it is now addressable at this address x. In this case, the address assignment is ended 17. Otherwise, the bus master 1 repeats the operations 14 to 16.

The identification k can be defined for the bus master 1—see FIG. 2—for example via a keyboard 18 or any other input device. In addition, it should further be mentioned that the repetition of operations 14 to 16 can be restricted to a predefined number, e.g. three or four passes.

Before assuming the address x which is to be assigned, the bus device 2' has its address adr' initially set 19 to the value 126. The bus device 2' then receives 20 an address adr via the bus system, at which the bus master 1 addresses the bus devices 2, 2'. The bus device 2' checks 21 whether the received address adr corresponds to its own address adr'. If not, the bus device 2' concerned is not addressed and therefore ends 22 the further reception of information.

If the addresses adr, adr' correspond, the bus device 2' checks 23 whether its address adr' is still set to the value 126. If not, a new address has already been assigned to this bus device 2'. In this case, it processes 24 a different response. Otherwise, the bus device 2' receives 25 the transmitted identification k and the address x which is to be assigned.

The bus device 2' then checks 26 whether the transmitted identification k corresponds to the identification k' stored in it. If not, it is not addressed and ends 27 the address change routine. Otherwise, it assumes 28 the transmitted address x as its new address adr'. The transmitted address x is stored by the bus device 2' in the EEPROM 9, i.e. retentively. In the event of further calling, this bus device 2' is then no longer addressable at the address 126, but at the address x.

The address k may also be stored non-retentively by the bus device 2'. In this case, the predefined address, e.g. 126, can always be assumed initially, e.g. on start-up.

In principle, a separate message can be used for each identification address pair. However, a plurality of pairs can also be combined if necessary into one message. In the case of a large number of bus devices 2' newly connected to the bus system, a plurality of messages can also be transmitted, in each case with a plurality of pairs.

The decisive advantage of the present invention is that the bus device 2' does not acknowledge the transmission of the identification k and the new address x. As a result, a plurality of bus devices 2' can be newly connected to the bus system in one pass.

The invention has been described in detail with particular reference to preferred embodiments thereof and examples, but it will be understood that variations and modifications can be effected within the spirit and scope of the invention.

What is claimed is:

1. An address assignment method for at least one bus device that has been newly connected to a bus system, comprising:
    transmitting a new address and an identification from a bus master to a bus device initially addressable at a pre-set address;
    comparing, at the bus device, the identification transmitted from the bus master with a preset identification stored in the bus device; and
    assuming, at the bus device, the new address transmitted from the bus master, if the identification transmitted from the bus master corresponds to the preset identification stored in the bus device, so that the bus device is subsequently addressable at the new address.

2. An address assignment method as claimed in claim 1, wherein said method does not comprise acknowledging, by the bus device, transmission of the identification and the new address.

3. An address assignment method as claimed in claim 1, further comprising checking by the bus master, before transmitting the identification and the new address, whether a different bus device is already addressable at the new address.

4. An address assignment method as claimed in claim 1, further comprising:
    checking by the bus master, immediately after transmitting the identification and the new address, whether the bus device newly connected to the bus system is addressable at the new address, and
    retransmitting the identification and the new address by the bus master, if the bus device newly connected to the bus system is not addressable.

5. An address assignment method as claimed in claim 1, further comprising retentively storing the new address by the bus device.

6. An address assignment method as claimed in claim 1, wherein the bus system uses a field bus.

7. An address assignment method as claimed in claim 1, wherein the bus system uses a PROFIBUS.

8. At least one computer readable medium storing a program to control a bus master to perform a method comprising:
    transmitting a new address and an identification from a bus master to a bus device initially addressable at a pre-set address;
    comparing, at the bus device, the identification transmitted from the bus master with a preset identification stored in the bus device; and
    assuming, at the bus device, the new address transmitted from the bus master, if the identification transmitted from the bus master corresponds to the preset identification stored in the bus device, so that the bus device is subsequently addressable at the new address.

9. At least one computer readable medium as claimed in claim 8, wherein said method does not comprise acknowledging, by the bus device, transmission of the identification and the new address.

10. At least one computer readable medium as claimed in claim 8, said method further comprising checking by the bus master, before transmitting the identification and the new address, whether a different bus device is already addressable at the new address.

11. At least one computer readable medium as claimed in claim 8, further comprising:

checking by the bus master, immediately after transmitting the identification and the new address, whether the bus device newly connected to the bus system is addressable at the new address, and retransmitting the identification and the new address by the bus master, if the bus device newly connected to the bus system is not addressable.

12. At least one computer readable medium as claimed in claim 8, further comprising retentively storing the new address by the bus device.

13. At least one computer readable medium as claimed in claim 8, wherein the bus system uses a field bus.

14. A bus master connected via a bus system to at least one bus device that has been newly connected to the bus system, comprising:

an output unit to transmit a new address and an identification to a bus device initially addressable at a pre-set address, the bus device comparing the identification transmitted from said bus master with a preset identification stored in the bus device and assuming the new address transmitted from said bus master, if the identification transmitted from said bus master corresponds to the preset identification stored in the bus device, so that the bus device is subsequently addressable at the new address.

15. A bus master as claimed in claim 14, further comprising a checking unit to check whether a different bus device is already addressable at the new address before transmitting the identification and the new address.

16. A bus master as claimed in claim 15, wherein the checking unit also checks whether the bus device newly connected to the bus system is addressable at the new address, immediately after transmitting the identification and the new address, and wherein the output unit retransmits the identification and the new address, if the bus device newly connected to the bus system is not addressable.

17. A bus master as claimed in claim 14, wherein the bus device uses a field bus.

18. A bus device newly connected via a bus system to a bus master, comprising:

an input unit to receive a new address and an identification from a bus master to a bus device initially addressable at a pre-set address;

at least one storage unit to store a preset identification; and a processing unit to compare the identification transmitted from the bus master with the preset identification and to assume the new address transmitted from the bus master, if the identification transmitted from the bus master corresponds to the preset identification stored in said at least one storage unit, so that said bus device is subsequently addressable at the new address.

19. A bus device as claimed in claim 18, wherein said bus device does not acknowledge receipt of the identification and the new address.

20. A bus device as claimed in claim 18, wherein said at least one storage unit retentively stores the new address by the bus device.

21. A bus device as claimed in claim 18, wherein the bus system uses a field bus.

\* \* \* \* \*